US010983622B2

(12) United States Patent
Miyashita et al.

(10) Patent No.: US 10,983,622 B2
(45) Date of Patent: Apr. 20, 2021

(54) DISPLAY DEVICE AND TOUCH DETECTION DEVICE

(71) Applicant: Japan Display Inc., Tokyo (JP)

(72) Inventors: Hiromasa Miyashita, Tokyo (JP); Kinichi Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/678,326

(22) Filed: Nov. 8, 2019

(65) Prior Publication Data

US 2020/0150807 A1 May 14, 2020

(30) Foreign Application Priority Data

Nov. 8, 2018 (JP) .............................. JP2018-210187

(51) Int. Cl.
*G06F 3/041* (2006.01)
*G06F 3/044* (2006.01)
*G06F 3/047* (2006.01)

(52) U.S. Cl.
CPC ............ *G06F 3/0412* (2013.01); *G06F 3/047* (2013.01); *G06F 3/0446* (2019.05); *G06F 2203/04112* (2013.01)

(58) Field of Classification Search
CPC ...... G06F 3/0412; G06F 3/0446; G06F 3/047; G06F 2203/04112; G06F 3/04164
See application file for complete search history.

(56) References Cited

U.S. PATENT DOCUMENTS

| 6,079,818 A * | 6/2000 | Wakahara | B41J 2/4155 |
| | | | 347/55 |
| 2016/0291723 A1 | 10/2016 | Kurasawa et al. | |
| 2017/0075498 A1* | 3/2017 | Zhuang | H01L 27/1214 |
| 2017/0177120 A1* | 6/2017 | Kyutoku | G06F 3/044 |
| 2019/0325186 A1* | 10/2019 | Gao | G06K 9/0002 |

FOREIGN PATENT DOCUMENTS

JP 2016-99315 A 5/2016

* cited by examiner

*Primary Examiner* — Sahlu Okebato
(74) *Attorney, Agent, or Firm* — K&L Gates LLP

(57) ABSTRACT

According to one embodiment, a display device includes a first substrate including drive electrodes, a second substrate facing the first substrate and including detection electrodes, and a mesh-patterned first shield electrode arranged in a non-display region in the second substrate. The first shield electrode has a first opening and an island-shaped first electrode portion.

19 Claims, 13 Drawing Sheets

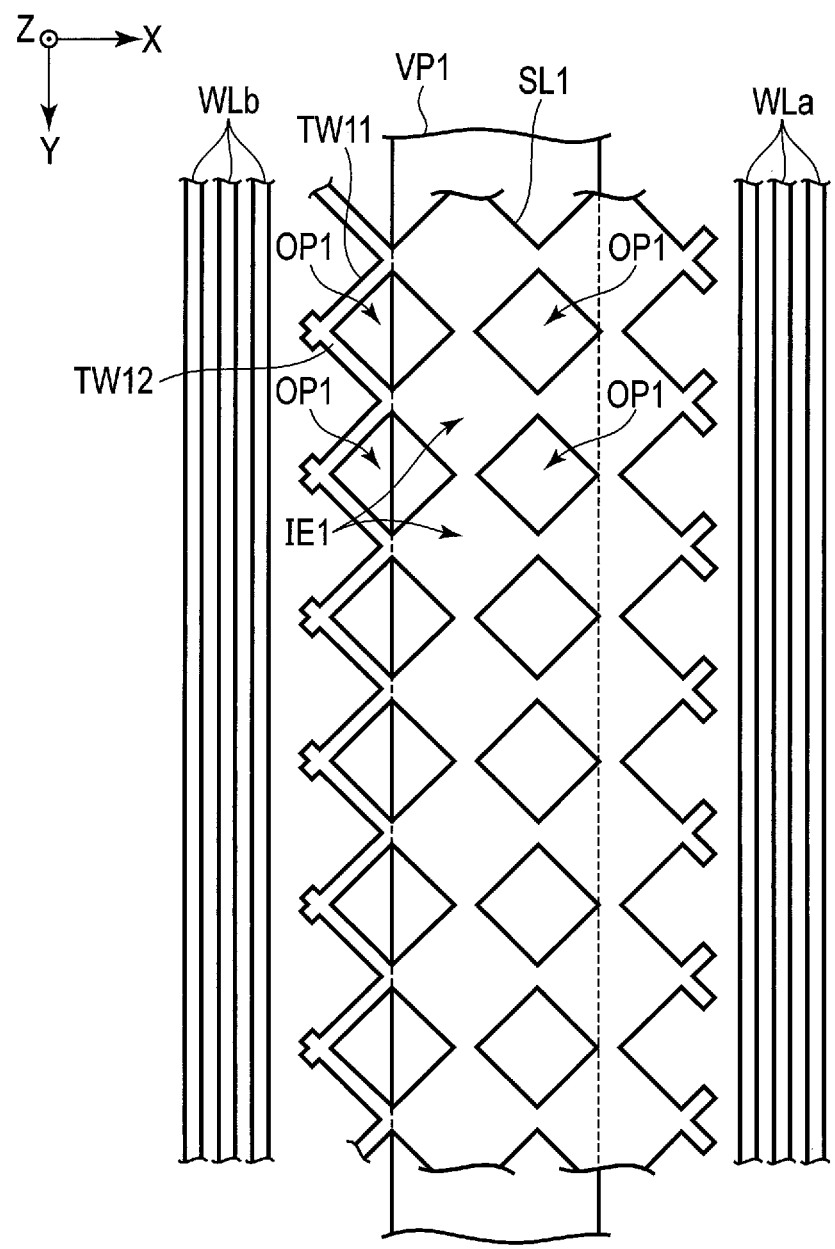
F I G. 10

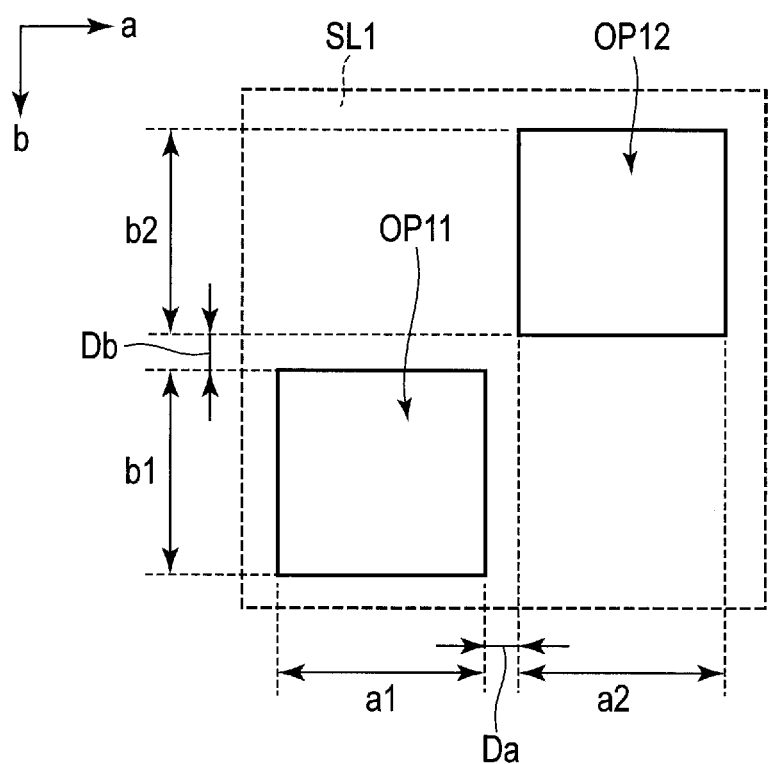
F I G. 11

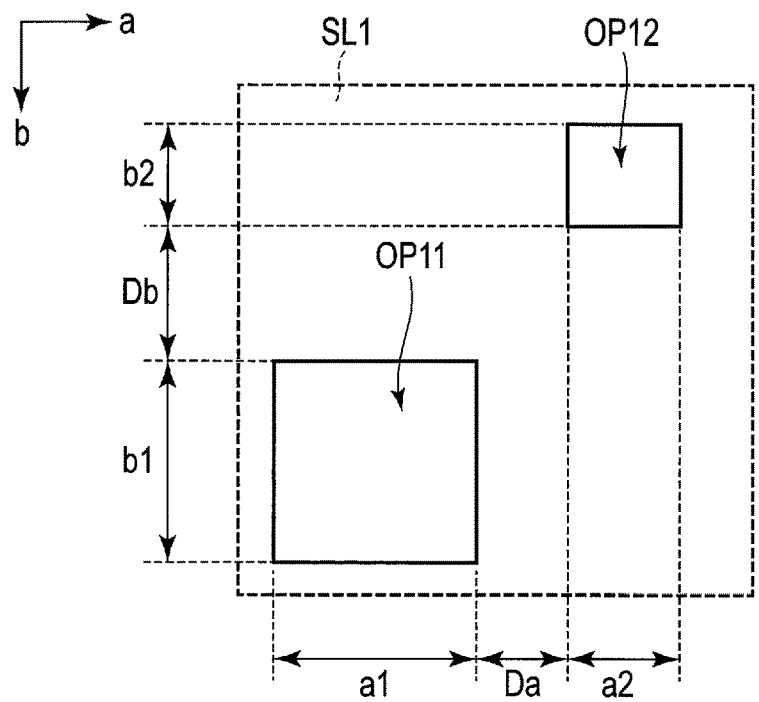
F I G. 15
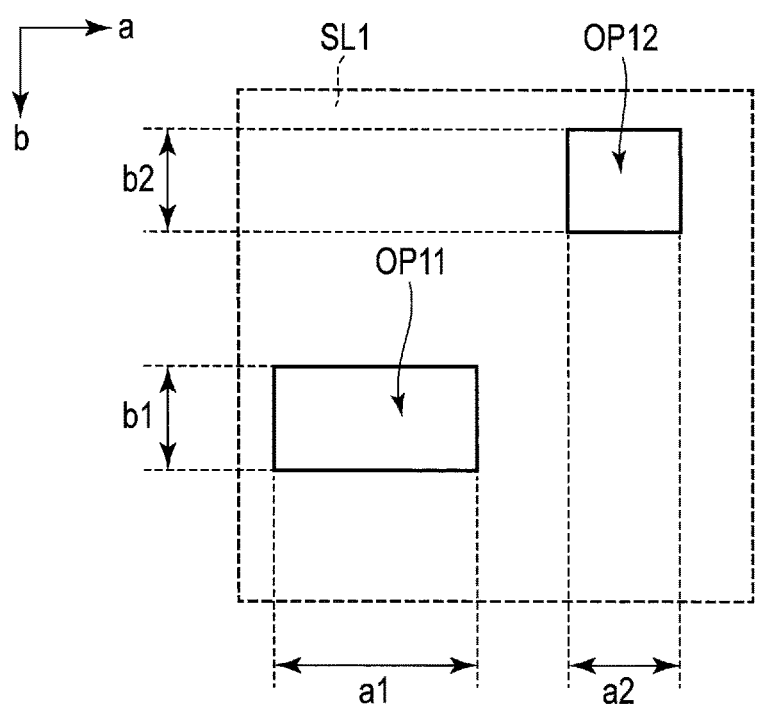
F I G. 16

DISPLAY DEVICE AND TOUCH DETECTION DEVICE

CROSS-REFERENCE TO RELATED APPLICATIONS

This application is based upon and claims the benefit of priority from Japanese Patent Application No. 2018-210187, filed Nov. 8, 2018, the entire contents of which are incorporated herein by reference.

FIELD

Embodiments described herein relate generally to a display device and a touch detection device.

BACKGROUND

A display device comprising a sensor which detects contact or approach of an object has been developed. As an example of an electrostatic capacitance type sensor, the following structure is known. That is, a drive electrode is provided in one of substrates which face each other, and a detection electrode is provided in the other substrate. A power line for supplying a signal potential is electrically connected to the drive electrode, and a wiring line for reading an output signal is electrically connected to the detection electrode.

If the wiring line is capacitively coupled to, for example, the power line, a capacitance value detected by a detection circuit fluctuates, and sensitivity of the sensor may be deteriorated. Therefore, in order to suppress the capacitive coupling between the wiring line and the power line, the sensor may comprise a shield electrode overlapping the power line. Parasitic capacitance produced between the shield electrode and the wiring line should preferably be as low as possible. On the other hand, if the area of the shield electrode is reduced for the purpose of reducing the parasitic capacitance, electromagnetic interference (EMI) noise radiating from the power line cannot be sufficiently blocked.

SUMMARY

The present disclosure relates generally to a display device and a touch detection device.

According to one embodiment, a display device includes a first substrate including drive electrodes, a second substrate facing the first substrate and including detection electrodes, and a mesh-patterned first shield electrode arranged in a non-display region in the second substrate. The first shield electrode has a first opening and an island-shaped first electrode portion.

BRIEF DESCRIPTION OF THE DRAWINGS

FIG. 10 is an enlarged plan view of a vicinity of a power line VP1 shown in FIG. 9.

FIG. 11 is an enlarged plan view of a part of a shield electrode SL1 shown in FIG. 10.

FIG. 15 is a plan view showing another example of the shield electrode SL1.

FIG. 16 is a plan view showing another example of the shield electrode SL1.

DETAILED DESCRIPTION

Figure 1:
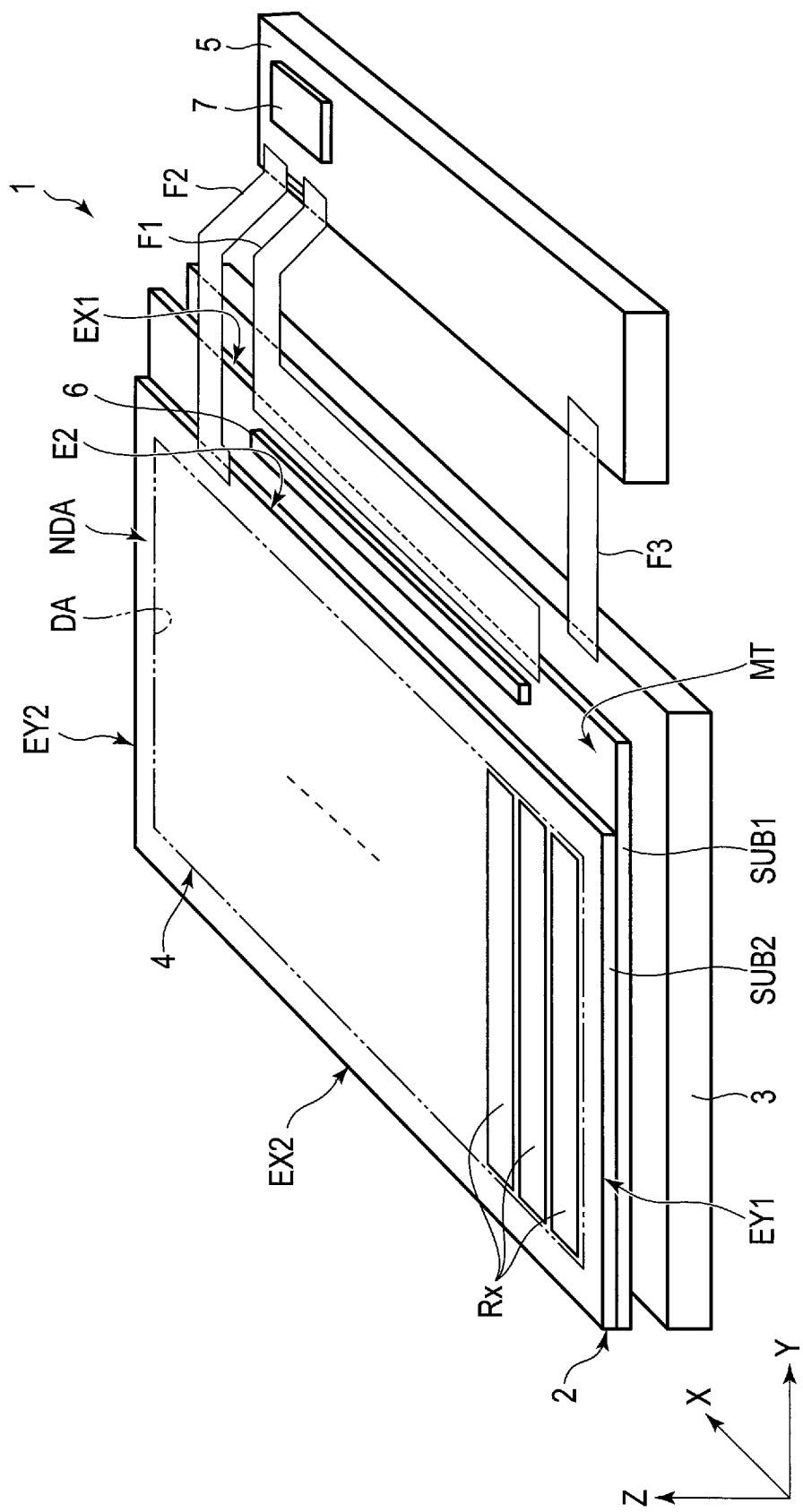
FIG. 1 is a perspective view schematically showing a display device 1 according to the first embodiment.

In general, according to one embodiment, a display device comprises a first substrate comprising drive electrodes, a second substrate facing the first substrate and comprising detection electrodes, and a mesh-patterned first shield electrode arranged in a non-display region in the second substrate. The first shield electrode comprises a first opening and an island-shaped first electrode portion.

According to another embodiment, a touch detection device comprises a first substrate comprising drive electrodes, a second substrate facing the first substrate and comprising detection electrodes, and a mesh-patterned first shield electrode arranged in a region in which the detection electrodes are not arranged, in the second substrate. The first shield electrode comprises a first opening and an island-shaped first electrode portion.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

In the present embodiment, a liquid crystal display device having a detector is disclosed as an example of a display device. This liquid crystal display device can be used for various devices such as a smartphone, a tablet computer, a mobile telephone, a personal computer, a television receiver, a vehicle-mounted device, and a game console. As the display device having the detector, other display devices such as a self-luminous display device comprising an organic electroluminescent (EL) element layer, a micro (μ) LED element or the like, and an electronic paper type display device comprising an electrophoretic element or the like can be applied.

FIG. 1 is a perspective view schematically showing a display device 1 according to the first embodiment. A first direction X, a second direction Y and a third direction Z shown in the drawing are orthogonal to one another. Note that the first direction X, the second direction Y and the third direction Z may cross one another at an angle other than 90 degrees. In the present specification, a direction toward the pointing end of an arrow indicating the third direction Z is referred to as above, and a direction toward the opposite side from the pointing end of the arrow is referred to as below. In addition, an observation position at which the display device 1 is observed is assumed to be located on the pointing end side of the arrow indicating the third direction Z, and a view in an X-Y plane defined by the first direction X and the second direction Y from this observation position is called a planar view.

The display device 1 comprises a display panel 2, an illumination unit 3, a sensor 4, a control module 5, an IC chip 6, an IC chip 7, wiring substrates F1, F2 and F3, and the like.

The display panel 2 is, for example, a liquid crystal display panel. The display panel 2 comprises a first substrate SUB1, a second substrate SUB2, and a liquid crystal layer (not shown) which is held between the first substrate SUB1 and the second substrate SUB2. The first substrate SUB1 and the second substrate SUB2 face each other in the third direction Z. The display panel 2 has, for example, a rectangular shape. In the example illustrated, the display panel 2 has a substantially rectangular shape and has a pair of end portions EX1 and EX2 extending in the first direction X and a pair of end portions EY1 and EY2 extending in the second direction Y. However, the display panel 2 is not limited to the example illustrated. Furthermore, the display panel 2 comprises a mounting portion MT in which the first substrate SUB1 extends farther than the second substrate SUB2. In the example illustrated, the mounting portion MT corresponds to a region of the first substrate SUB1 which extends farther in the second direction Y than an end portion E2 of the second substrate SUB2. The end portion E2 is located between a display region DA and the end portion EX1, and extends in the first direction X.

The display panel 2 comprises the display region DA in which an image is displayed, and a non-display region NDA which surrounds the display region DA. The display region DA is located within a region in which the first substrate SUB1 and the second substrate SUB2 overlap each other. In the example illustrated, the display region DA has a substantially rectangular shape and has a pair of long sides extending in the first direction X and a pair of short sides extending in the second direction Y. However, the display region DA is not limited to the example illustrated. The display panel 2 is, for example, a transmissive type liquid crystal display panel which displays an image by selectively transmitting light from the illumination unit 3. Note that the display panel 2 may be a reflective type display panel which displays an image by selectively reflecting external light or the light from the illumination unit 3 or may be a transflective type display panel which has both the display function of the transmissive type display panel and the display function of the reflective type display panel.

The illumination unit 3 is provided on the rear surface side of the display panel 2, that is, directly below the first substrate SUB1. The illumination unit 3 has substantially the same shape and substantially the same size as the display panel 2. The illumination unit 3 illuminates the entire region of the display region DA. Although various modes can be applied to the illumination unit 3, the illumination unit 3 comprises, for example, a light guide which faces the first substrate SUB1, and a light source such as a light-emitting diode (LED) which is provided in an end portion of the light guide.

The sensor 4 is, for example, an electrostatic capacitance type sensor. The sensor 4 corresponds to a touch detection device which detects an object contacting or approaching the display panel 2. The sensor 4 comprises a plurality of detection electrodes Rx provided in the second substrate SUB2.

The IC chip 6 is mounted on the mounting portion MT. The IC chip 6 outputs various signals for displaying an image in the display region DA. The IC chip 7 is provided in the control module 5. The IC chip 7 outputs various signals for driving the sensor 4.

The wiring substrate F1 electrically connects the first substrate SUB1 and the control module 5. The wiring substrate F2 electrically connects the second substrate SUB2 and the control module 5. The wiring substrate F3 electrically connects the illumination unit 3 and the control module 5. The wiring substrates F1, F2 and F3 are, for example, flexible wiring substrates. The signals output from the IC chip 7 for driving the sensor 4 are supplied to the display panel 2 via the wiring substrates F1 and F2.

Figure 2:
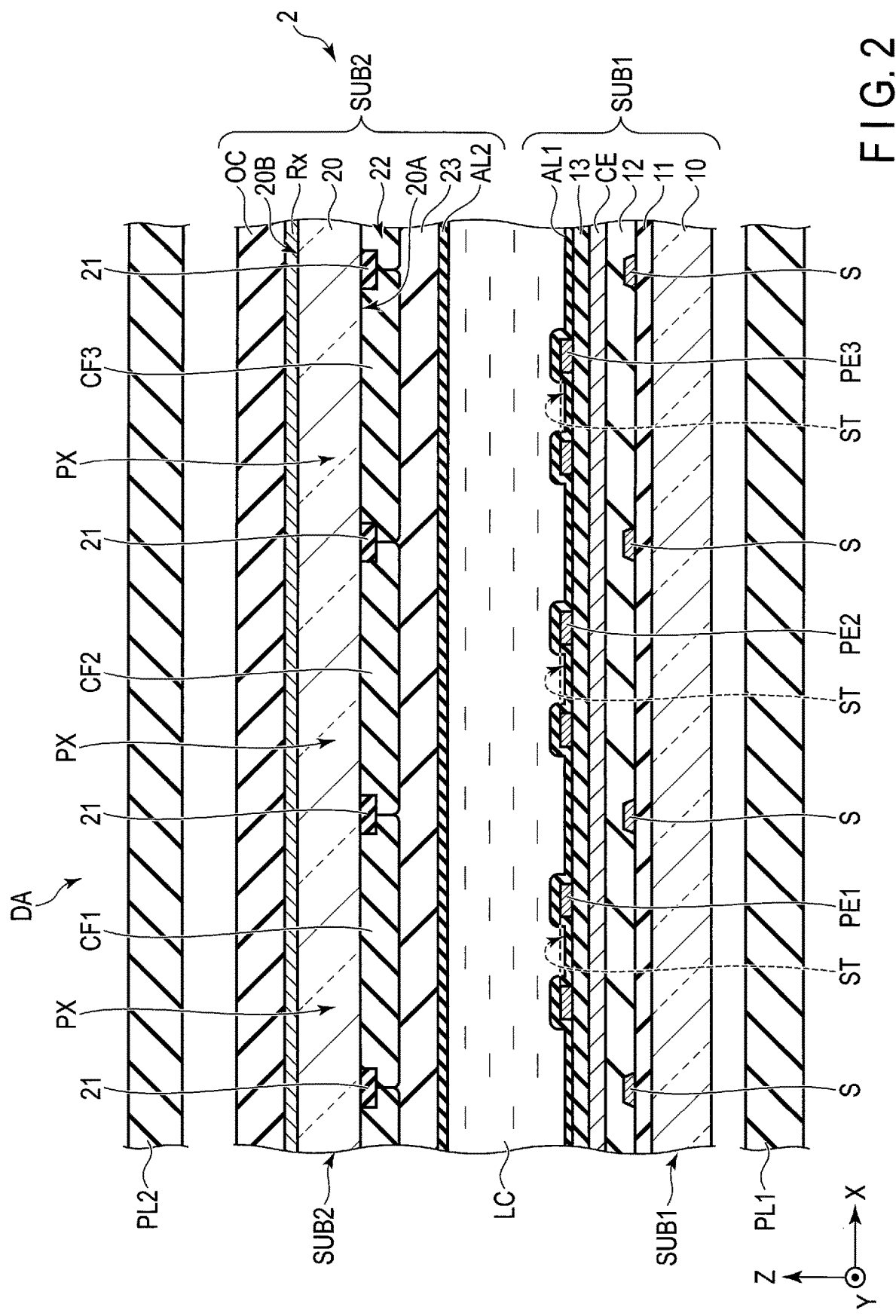
FIG. 2 is a sectional view showing a configuration example of a display region DA shown in FIG. 1.

FIG. 2 is a cross-sectional view showing a configuration example of the display region DA shown in FIG. 1. The first substrate SUB1 comprises a basement 10, insulating layers 11, 12 and 13, signal lines S, a common electrode CE, pixel electrodes PE (PE1, PE2 and PE3), an alignment film AL1 and the like. The basement 10 is formed of, for example, a transparent insulating material such as glass or resin. The insulating layer 11 is formed on the basement 10. The signal lines S are formed on the insulating layer 11 and are covered with the insulating layer 12. The common electrode CE is formed on the insulating layer 12 and is covered with the insulating layer 13. The pixel electrodes PE are formed on the insulating layer 13 and are covered with the alignment film AL1. Each pixel electrode PE is arranged in a region between the signal lines S which are adjacent to each other in the first direction X, and faces the common electrode CE. In the example illustrated, each pixel electrode PE has a slit ST. Each of the pixel electrode PE and the common electrode CE is formed of, for example, a transparent conductive material such as indium tin oxide (ITO) or indium zinc oxide (IZO).

The second substrate SUB2 comprises an overcoat layer OC, a basement 20, a light-shielding layer 21, a color filter layer 22, an overcoat (planarizing film) layer 23, an alignment film AL2 and the like, in addition to the detection electrodes Rx. The basement 20 is formed of, for example, a transparent insulating material such as glass or resin. The basement 20 has a first surface 20A which faces the first substrate SUB1 and a second surface 20B which is located on the opposite side from the first surface 20A. The detection electrodes Rx are formed on the second surface 20B and are covered with the overcoat layer OC. The light-shielding layer 21 is provided on the first surface 20A. The light-shielding layer 21 faces each signal line S and delimits each pixel PX. Here, the pixel PX corresponds to a minimum unit which can be individually controlled in response to an image signal. The color filter layer 22 covers the light-shielding layer 21 and is also in contact with the basement 20. The color filter layer 22 includes a red color filter CF1, a green color filter CF2 and a blue color filter CF3. The color filters CF1, CF2 and CF3 face the pixel electrodes PE1, PE2 and PE3, respectively. The overcoat layer 23 covers the color filter layer 22. The alignment film AL2 covers the overcoat layer 23. Each of the overcoat layer 23 and the overcoat layer OC is formed of transparent resin.

The liquid crystal layer LC is sealed in between the alignment film AL1 and the alignment film AL2. The alignment films AL1 and AL2 are, for example, horizontal alignment films by which liquid crystal molecules are aligned in a direction parallel to the main surfaces of the basements 10 and 20. The orientations of the liquid crystal molecules included in the liquid crystal layer LC are controlled by an electric field formed between the common electrode CE and the pixel electrode PE.

In the present embodiment, the common electrode CE functions as an electrode for driving the liquid crystal molecules and also functions as a drive electrode Tx provided in the sensor 4. That is, the common electrode CE controls the orientations of the liquid crystal molecules in cooperation with the pixel electrode PE in a display period in which an image is displayed in the display region DA. On the other hand, the common electrode CE functions as the drive electrode Tx which is capacitively coupled to the detection electrode Rx in a sensing period in which an object contacting or approaching the display region DA is detected.

Figure 3:
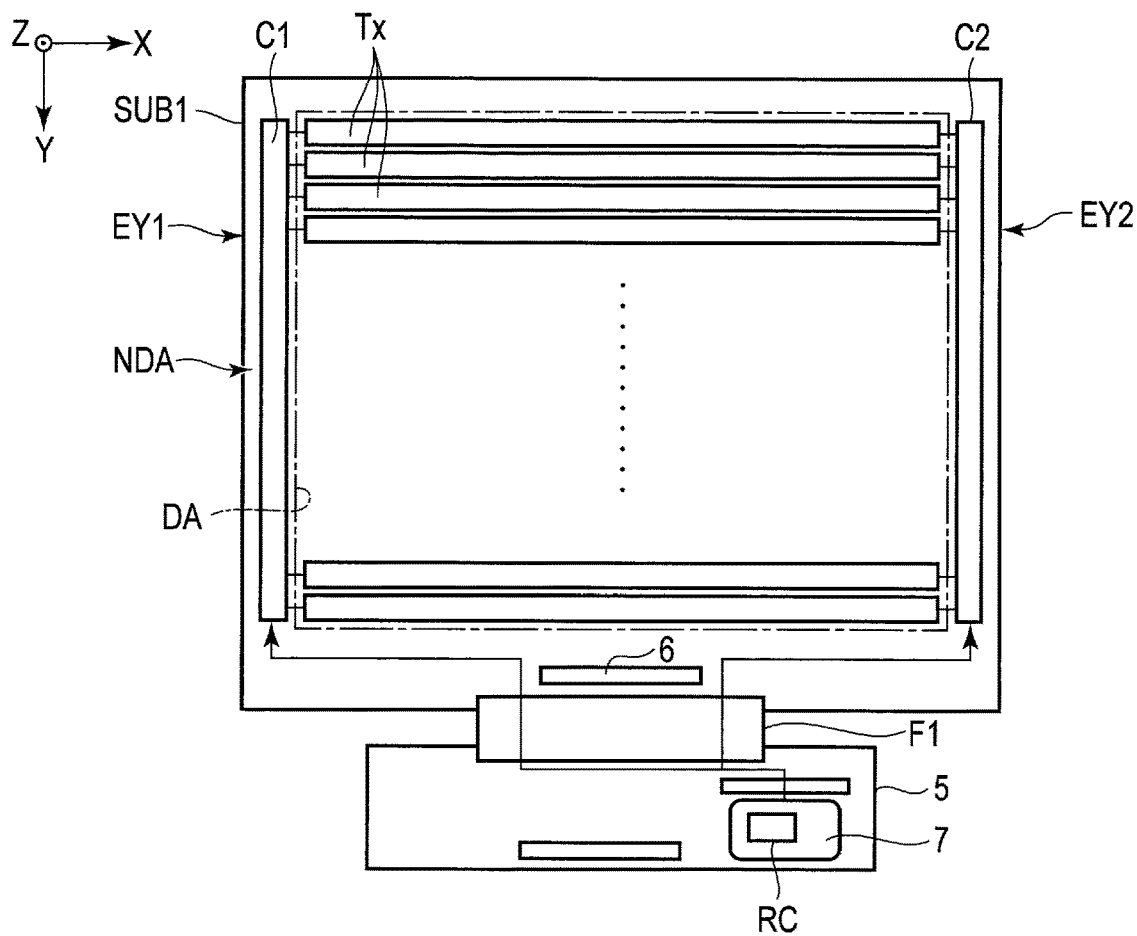
FIG. 3 is a plan view showing a configuration example of a first substrate SUB1 shown in FIG. 1.

FIG. 3 is a plan view showing a configuration example of the first substrate SUB1 shown in FIG. 1. The first substrate SUB1 comprises the drive electrodes Tx and switch circuits C1 and C2. The drive electrodes Tx are provided over almost the entire region of the display region DA. The drive electrodes Tx have, for example, a strip shape having a substantially constant width. In the example illustrated, the drive electrodes Tx extend in the first direction X, and are arranged in the second direction Y while being spaced a certain distance apart from one another in the second direction Y.

The switch circuits C1 and C2 are provided in the non-display region NDA and are electrically connected to the drive electrodes Tx. The switch circuits C1 and C2 face each other across the drive electrodes Tx. In the example illustrated, the switch circuit C1 extends in the second direction Y in the vicinity of the end portion EY1. The switch circuit C2 extends in the second direction Y in the vicinity of the end portion EY2.

Control signals supplied from the IC chip 7 are supplied respectively to the switch circuits C1 and C2 via the wiring substrate F1. In the example illustrated, the IC chip 7 comprises a detection circuit RC. The detection circuit RC detects a sensor output signal which is output from the sensor 4. Note that the detection circuit RC may be provided in the control module 5.

Figure 4:
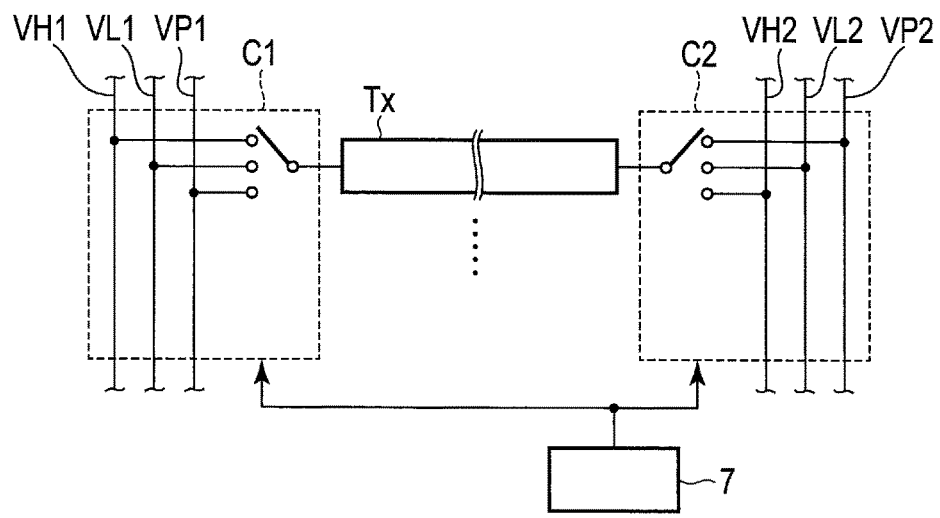
FIG. 4 is an illustration schematically showing connecting portions which electrically connect a drive electrode Tx and switch circuits C1 and C2.

FIG. 4 is an illustration schematically showing connecting portions which electrically connect the drive electrode Tx and the switch circuits C1 and C2 shown in FIG. 3. The switch circuit C1 includes potential supply lines VH1 and VL1 and a power line VP1. The potential supply lines VH1 and VL1 are wiring lines for supplying common potentials to the drive electrode Tx (common electrode CE) in the display period. For example, a certain potential is supplied to the potential supply line VH1, and a certain potential lower than that of the potential supply line VH1 is supplied to the potential supply line VL1. The power line VP1 is a wiring line for supplying an AC potential as a sensor drive signal to the drive electrode Tx in the sensing period.

The configuration of the switch circuit C2 is similar to that of the switch circuit C1. That is, the switch circuit C2 includes potential supply lines VH2 and VL2 for supplying common potentials in the display period, and a power line VP2 for supplying a sensor drive signal in the sensing period. The same potential as that of the potential supply line VH1 is supplied to the potential supply line VH2, and the same low potential as that of the potential supply line VL1 is supplied to the potential supply line VL2. The same AC potential as that of the power line VP1 is supplied to the power line VP2.

The connections in the switch circuits C1 and C2 are switched in synchronization with each other such that the same potential will be supplied to the drive electrode Tx. This switching is controlled based on control signals supplied from the IC chip 7. That is, in the display period, the drive electrode Tx is electrically connected to the potential supply lines VH1 and VH2 or the potential supply lines VL1 and VL2 based on the control signals supplied from the IC chip 7. In the sensing period, the drive electrode Tx is electrically connected to the power lines VP1 and VP2 based on the control signals supplied from the IC chip 7.

Figure 5:
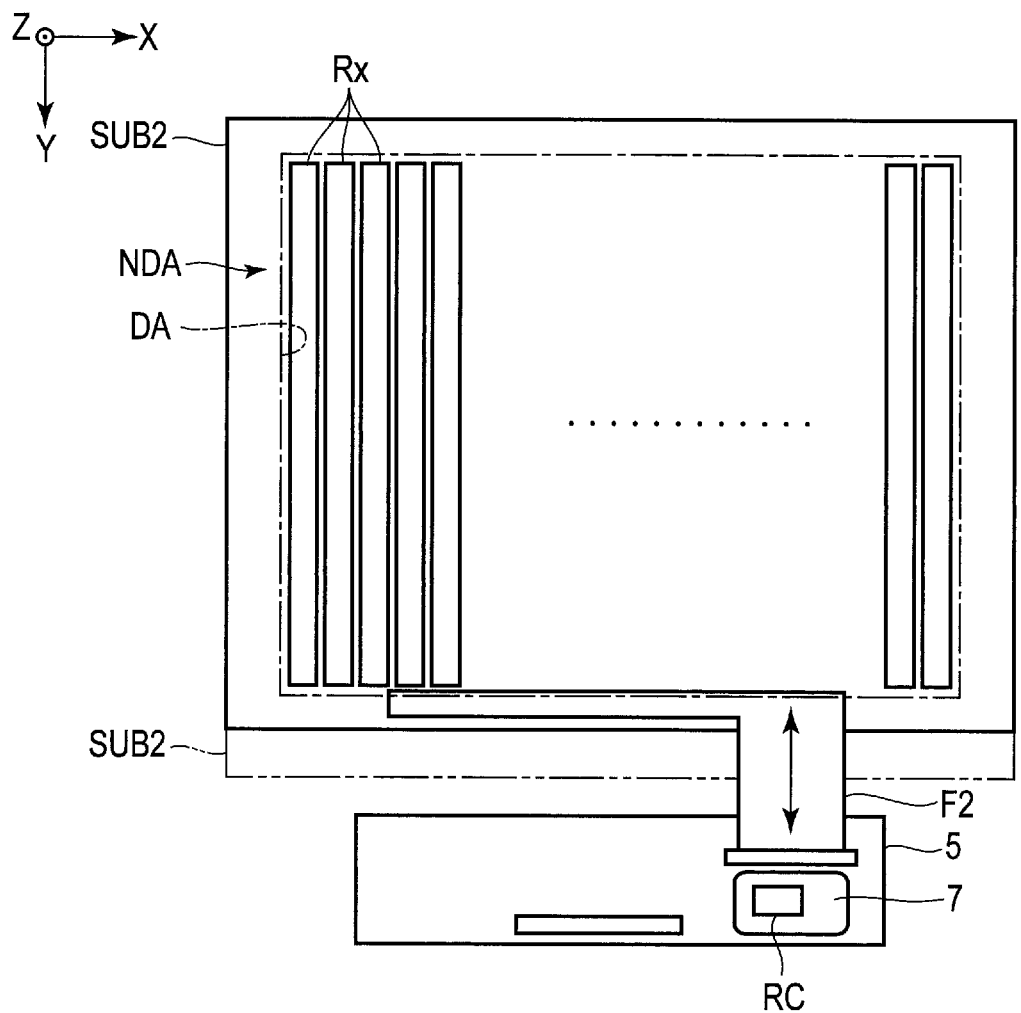
FIG. 5 is a plan view showing a configuration example of a second substrate SUB2 shown in FIG. 1.

FIG. 5 is a plan view showing a configuration example of the second substrate SUB2 shown in FIG. 1. The second substrate SUB2 comprises the detection electrodes Rx. The detection electrodes Rx are arranged over almost the entire region of the display region DA. In the example illustrated, the detection electrodes Rx extend in the second direction Y, and are arranged in the first direction X while being spaced a certain distance apart from one another in the first direction X.

The sensor output signals detected from the detection electrodes Rx in the sensing period are transmitted to the IC chip 7 via the wiring substrate F2. In the sensing period, if an object which is a conductor or a dielectric (for example, a finger) contacts or approaches the display region DA, a capacitance formed between the common electrode CE and the detection electrode Rx in the vicinity of the object changes. That is, the sensor output signal detected from the detection electrode Rx in the vicinity of the object exhibits a different value from those of the sensor output signals detected from the other detection electrodes Rx. The detection circuit RC detects that the object has contacted or approached the display region DA based on the change of the sensor output signal detected from the detection electrode Rx. In addition, the detection circuit RC specifies a position in the display region DA where the object has contacted or approached.

Figure 6:
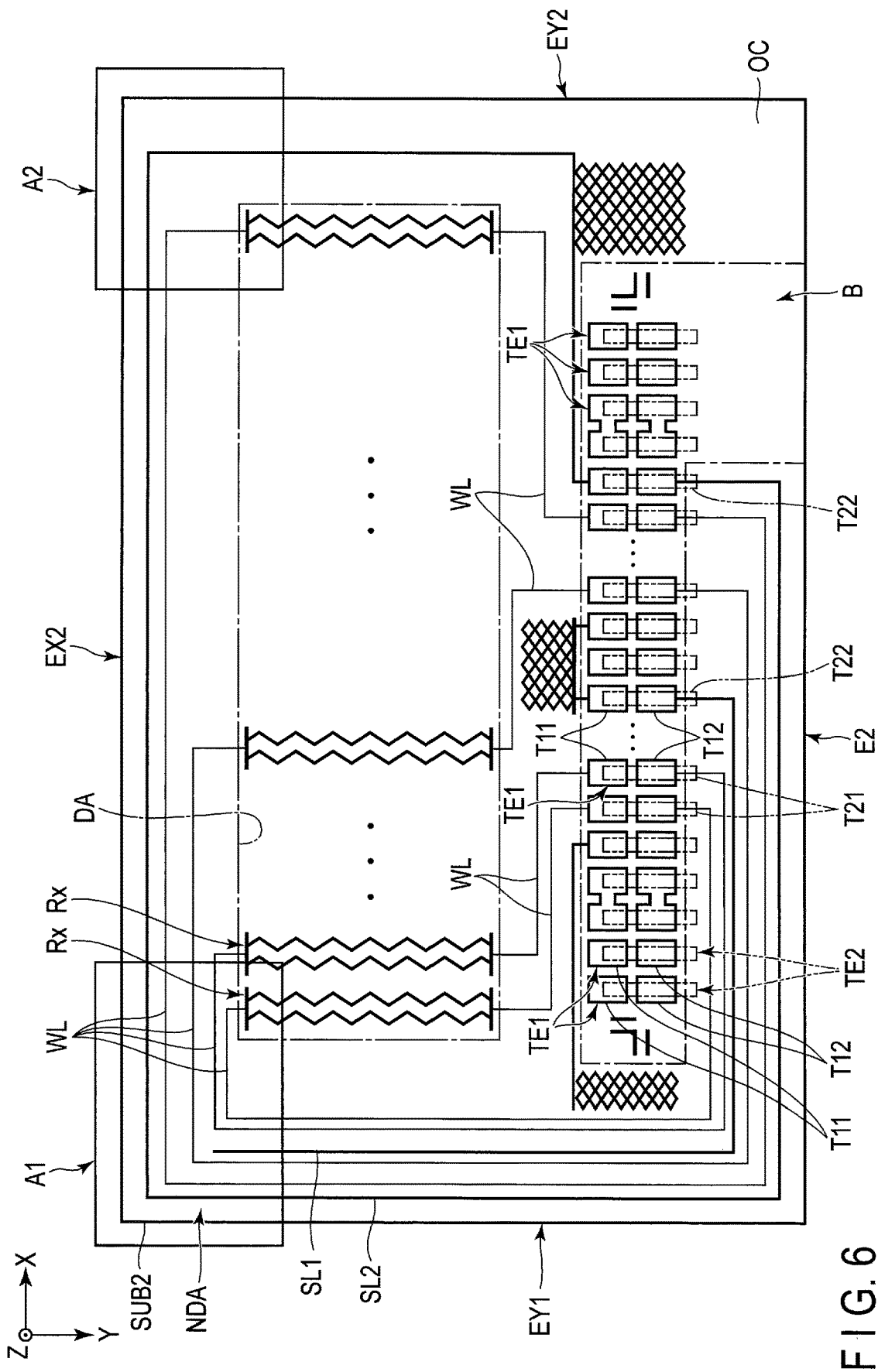
FIG. 6 is a plan view schematically showing a configuration example of a non-display region NDA shown in FIG. 5.

FIG. 6 is a plan view schematically showing a configuration example of the non-display region NDA shown in FIG. 5. The second substrate SUB2 comprises terminals TE1, wiring lines WL, shield electrodes SL1 and SL2 and the like in the non-display region NDA.

The terminals TE1 are electrically connected to the wiring substrate F2 shown in FIG. 5. The terminals TE1 are arranged in the first direction X between the detection electrodes Rx and the end portion E2. In the example illustrated, each terminal TE1 includes a first portion T11 and a second portion T12. The first portion T11 and the second portion T12 are spaced apart from each other in the second direction Y. The first portion T11 is closer to the display region DA than the second portion T12. The first portion T11 and the second portion T12 are electrically connected to the same detection electrode Rx by the wiring line WL.

The wiring lines WL are electrically connected to the detection electrodes Rx and are in a one-to-one correspondence with the detection electrodes Rx. In the example illustrated, the detection electrodes Rx are bent into a wave shape. For example, the wiring lines WL are drawn from both end portions of the detection electrodes Rx and are arranged in the non-display region NDA. In the example illustrated, all the wiring lines WL are arranged on the end portion EY1 side of the non-display region NDA. In other words, the wiring lines WL are not arranged in the non-display region NDA between the detection electrodes Rx and the end portion EY2. More specifically, the wiring lines WL drawn from the detection electrodes Rx to the end portion EX2 side extend along the end portion EX2, the end portion EY1 and the end portion E2, and are electrically connected to the second portions T12, respectively. The wiring lines WL drawn from the detection electrodes Rx to the end portion E2 side are electrically connected to the first portions T11, respectively.

Note that the arrangement of the wiring lines WL is not limited to the example illustrated. For example, the wiring lines WL may be arranged on the end portion EY2 side of the non-display region NDA. Alternatively, the wiring lines WL electrically connected to the detection electrodes Rx arranged on the left side region in the drawing may be arranged on end portion EY1 side of the non-display region NDA, and the wiring lines WL electrically connected to the detection electrodes Rx arranged on the right side region in the drawing may be arranged on the end portion EY2 side of the non-display region NDA.

The shield electrode SL1 is arranged between the wiring lines WL on the end portion EY1 side of the non-display region NDA. More specifically, the shield electrode SL1 extends along the end portion EY1, extends along the end portion E2 to the vicinity of the center of the second substrate SUB2, and is electrically connected to the second portion T12.

The shield electrode SL2 surrounds all the detection electrodes Rx and the shield electrode SL1. In the example illustrated, the shield electrode SL2 extends along the end portions E2, EY1, EX2 and EY2, and surrounds the terminals TE1 except some terminals TE1 located on the end portion EY2 side. The shield electrode SL2 may be disconnected in part or may extend along two or three end portions of the end portions E2, EY1, EX2 and EY2. Alternatively, the shield electrode SL2 may be arranged in such a manner as to surround all the terminals TE1.

As indicated by a dash-dot-dot line in the drawing, each terminal TE2 provided in the wiring substrate F2 overlaps both the first portion T11 and the second portion T12. The terminal TE1 and the terminal TE2 are attached to each other by, for example, an anisotropic conductive film or the like, and are electrically connected to each other. The sensor output signals output from the detection electrodes Rx are transmitted to the IC chip 7 shown in FIG. 1 via terminals T21 of the terminals TE2 which are electrically connected to the detection electrodes Rx. The potentials applied to the shield electrodes SL1 and SL2 are supplied from the IC chip 7 via terminals T22 of the terminals TE2.

The potential of each of the shield electrodes SL1 and SL2 is, for example, the same potential as the potential (amplitude) of the detection electrode Rx. Alternatively, the potential of each of the shield electrodes SL1 and SL2 is, for example, a fixed potential such as a ground potential. If the potential of each of the shield electrodes SL1 and SL2 is a fixed potential, the potential of each of the shield electrodes SL1 and SL2 may be supplied from a power line other than the IC chip 7.

Each of the detection electrode Rx, the wiring line WL, the terminal TE1 and the shield electrodes SL1 and SL2 may be formed of a metal material such as molybdenum, tungsten, titanium or aluminum and may have a single layer structure or a multilayer structure. Each of the wiring line WL, the terminal TE1 and the shield electrodes SL1 and SL2 is provided on the second surface 20B of the basement 20 and can be formed of the same material as that of the detection electrode Rx. In the example illustrated, the overcoat layer OC is provided over the entire surface of the second substrate SUB2 except for the vicinity of the terminals TE1. In the example illustrated, the overcoat layer OC is not provided in a substantially L-shaped region B which overlaps the wiring substrate F2. The overcoat layer OC covers all the detection electrodes Rx, the wiring lines WL and the shield electrodes SL1 and SL2. As a result, corrosion or the like of the detection electrodes Rx, the wiring lines WL and the shield electrodes SL1 and SL2 is suppressed.

Figure 7:
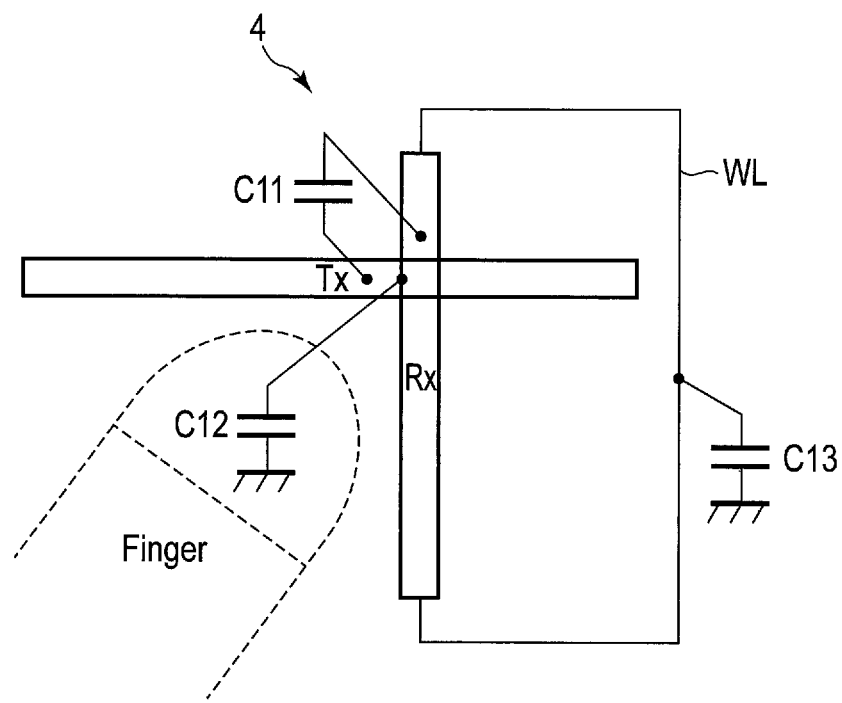
FIG. 7 is an illustration schematically showing a sensor 4.

FIG. 7 is an illustration schematically showing the sensor 4. A capacitance C11 is formed between the detection electrode Rx and the drive electrode Tx. If a finger contacts the display panel 2, capacitive coupling occurs between the finger and the drive electrode Tx and between the finger and the detection electrode Rx. At this time, a capacitance C12 is formed between the finger and these drive electrode Tx and detection electrode Rx. Furthermore, if there is a potential difference between the wiring line WL and the other conductor located around the wiring line WL, a parasitic capacitance C13 is produced between the wiring line WL and the other conductor. Here, the other conductor corresponds to, for example, the shield electrodes SL1 and SL2 and the like shown in FIG. 6.

Figure 8:
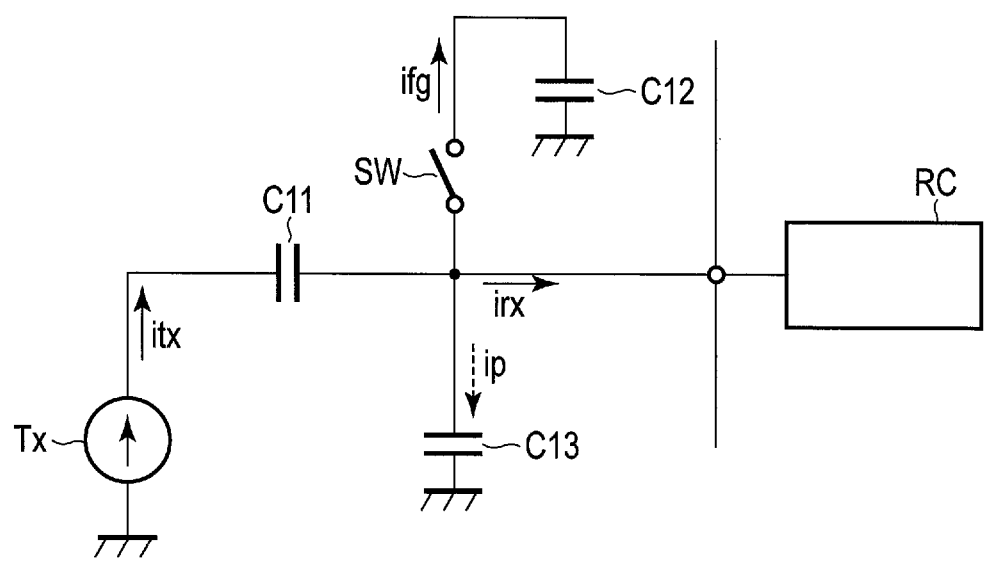
FIG. 8 is an illustration showing an equivalent circuit of FIG. 7.

FIG. 8 is an illustration showing an equivalent circuit of FIG. 7. A change rate DI of the sensor output signal detected by the detection circuit RC is represented by irx/itx. Here, irx is a current flowing through the detection electrode Rx, and itx is a current flowing through the drive electrode Tx. If a finger contacts the display panel 2, due to the capacitance C12, a current ifg of the current itx flows to the finger side. Therefore, a change rate DI1 of the sensor output signal in a case where a finger is in contact with the display panel 2 is represented by the following formula.

$$DI1=(itx-ifg)/itx$$

Furthermore, if the parasitic capacitance C13 is produced between the wiring line WL and the other conductor, a current ip of the current itx flows to the parasitic capacitance C13 side. Therefore, a change rate DI2 of the sensor output signal in a case where a finger is in contact with the display panel 2 and the parasitic capacitance C13 is produced is represented by the following formula.

$$DI2=(itx-ip-ifg)/(itx-ip)$$

From the above, DI2<DI1 is established. That is, if the parasitic capacitance C13 is high, the change rate of the sensor output signal is low, and the detection sensitivity of the sensor 4 will be deteriorated. Therefore, it is necessary to reduce the capacitive coupling between the wiring line WL and the other wiring line as much as possible in the sensor 4.

Figure 9:
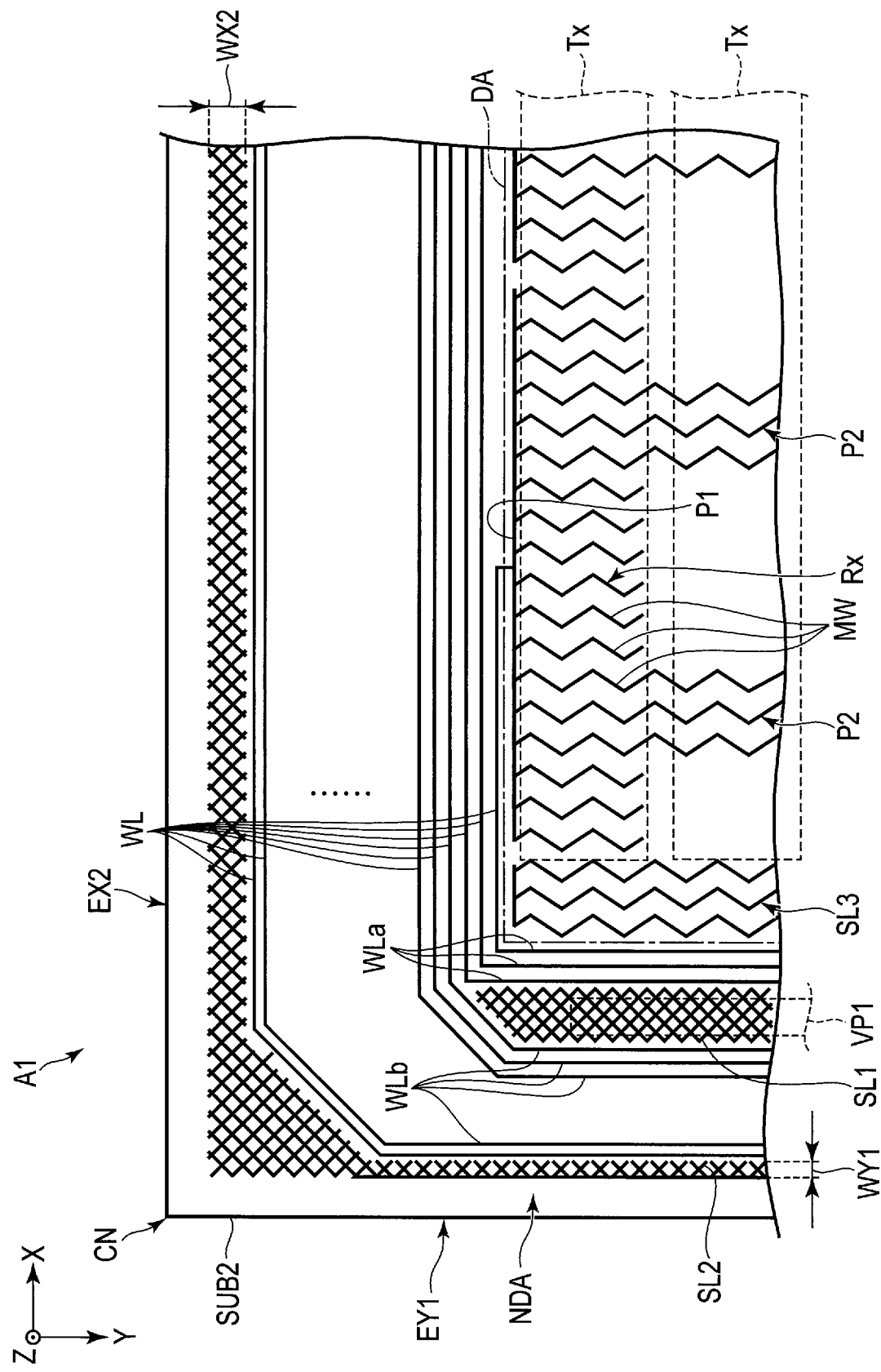
FIG. 9 is an enlarged plan view of a region A1 shown in FIG. 6.

FIG. 9 is an enlarged plan view of a region A1 shown in FIG. 6. The region A1 is a region including the end portion EX2 and the end portion EY1. As indicated by a dotted line, the power line VP1 provided in the first substrate SUB1 is located in the region A1 and extends in a direction in which the drive electrodes Tx are arranged, that is, in the second direction Y.

The wiring lines WL do not overlap the power line VP1. That is, in the non-display region NDA in the vicinity of the end portion EY1, some wiring lines WLa of the wiring lines WL extending in the second direction Y are located between the power line VP1 and the display region DA in a planar view, and the other wiring lines WLb are located between the power line VP1 and the shield electrode SL2 in a planar view. Since the wiring lines WL do not overlap the power line VP1, the impact of EMI noise radiating from the power line VP1 on the detection electrodes Rx can be reduced.

Each detection electrode Rx is formed of an aggregate of thin metal wires MW which are bent into a wave shape. The thin metal wires MW extend in substantially the second direction Y. In the example illustrated, each detection electrode Rx comprises a connecting portion P1 and electrode portions P2. The connecting portion P1 extends in the first direction X. The thin metal wires MW included in one detection electrode Rx are connected to the connecting portion P1. Some thin metal wires MW constitute the electrode portions P2. The detection electrode Rx comprises, for example, two electrode portions P2. In the example illustrated, each electrode portion P2 is formed of three thin metal wires MW. Although not shown in the drawing, in order to realize uniformity of display in the display region DA, a thin metal wire at a floating potential may be provided between the electrode portions P2.

The shield electrode SL1 overlaps the power line VP1. The shield electrode SL1 extends in the second direction Y and between the wiring lines WLa and the wiring lines WLb. Note that the shield electrode SL1 is spaced apart from the wiring lines WL. Since the power line VP1 to which the sensor drive signal is supplied is covered with the shield electrode SL1 at, for example, the same potential as that of the detection electrode Rx, capacitive coupling between the power line VP1 and the wiring line WL which are at different potentials can be suppressed. Furthermore, in the present embodiment, the shield electrode SL1 has a mesh pattern. Since the shield electrode SL1 has a mesh pattern, an overlapping area in which the shield electrode SL1 and the power line VP1 overlap is reduced. Therefore, even if the shield electrode SL1 and the power line VP1 are at different potentials, capacitive coupling between the shield electrode SL1 and the power line VP1 can be suppressed, and the shield electrode SL1 can be easily driven with the same amplitude as that of the detection electrode Rx. As a result, as described with reference to FIG. 8, the decrease of the change rate of the sensor output signal output to the detection circuit RC can be suppressed, and the deterioration of the detection sensitivity of the sensor 4 can be suppressed.

The shield electrode SL2 is provided along the end portions EX2 and EY1 in a region on the outside of the detection electrodes Rx. In addition, the shield electrode SL2 is provided in a substantially triangular region in the vicinity of a corner portion CN in which the end portion EX2 and the end portion EY1 cross each other. More specifically, the shield electrode SL2 is arranged between the outermost wiring line WL and the end portion EX2 and between the outermost wiring line WL and the end portion EY1. For example, the shield electrode SL2 is spaced apart from both the end portion EX2 and the end portion EY1. In the example illustrated, a width WY1 of the shield electrode SL2 extending along the end portion EY1 is less than a width WX2 of the shield electrode SL2 extending along the end portion EX2.

The shield electrode SL2 blocks, for example, electrostatic discharge (ESD) noise entering from the end portions EX2 and EY1 and the like and coming toward the wiring lines WL. Therefore, entry of ESD noise to the sensor 4 is suppressed, and malfunction and breakdown of the sensor 4 are suppressed. Furthermore, as is the case with the shield electrode SL1, the shield electrode SL2 has a mesh pattern. Since the area of the shield electrode SL2 is reduced, even if the shield electrode SL2 and the wiring line WL are at different potentials, capacitive coupling between the shield electrode SL2 and the wiring line WL can be suppressed. As a result, as described with reference to FIG. 8, the decrease of the change rate of the sensor output signal output to the detection circuit RC can be suppressed, and the deterioration of the detection sensitivity of the sensor 4 can be suppressed.

In the example illustrated, the second substrate SUB2 comprises a shield electrode SL3 in addition to the shield electrodes SL1 and SL2. The shield electrode SL3 is arranged between the wiring lines WLa and the detection electrodes Rx. The potential of the shield electrode SL3 is, for example, the same potential as that of the detection electrode Rx. The shield electrode SL3 described above suppresses capacitive coupling between the wiring line WLa and the detection electrode Rx. Note that the potential of the shield electrode SL3 may be, for example, a fixed potential such as a ground potential. In the example illustrated, the shield electrode SL3 is located in the display region DA, and as is the case with the detection electrode Rx, the shield electrode SL3 is formed of wavy thin metal wires. Since the shape of the shield electrode SL3 is similar to the shape of the detection electrode Rx, the detection electrode Rx and the shield electrode SL3 become less visible in the display region DA.

FIG. 10 is an enlarged plan view of the vicinity of the power line VP1 shown in FIG. 9. The shield electrode SL1 comprises openings OP1 and electrode portions IE1. A part of the shield electrode SL1 overlaps the power line VP1 in a planar view. That is, at least some of the openings OP1, and some of the electrode portions IE1 overlap the power line VP1. In the present embodiment, the openings OP1 are regularly arranged. In the example illustrated, the openings OP1 are arranged in the first direction X and the second direction Y. In addition, the openings OP1 are arranged in a staggered manner in directions in which thin wires TW11 and TW12 which form the openings OP1 extend. The openings OP1 have, for example, a substantially square shape. Each electrode portion IE1 corresponds to an island-shaped region of the shield electrode SL1 which is surrounded by four openings OP1. Therefore, the electrode portions IE1 have, for example, a substantially square shape.

In the example illustrated, regarding each opening OP1 located on the wiring line WLa side, the entire region overlaps the power line VP1. On the other hand, regarding each opening OP1 located on the wiring line WLb side, substantially half of the region overlaps the power line VP1. In the present embodiment, the total area (first area) of regions in which the openings OP1 and the power line VP1 overlap is greater than or equal to 20% of the area (second area) of a region in which the power line VP1 and the shield electrode SL1 overlap. The second area here corresponds to the sum of the total area (first area) of the openings OP1 overlapping the power line VP1 and the total area of the electrode portions IE1 overlapping the power line VP1, of the shield electrode SL1. In addition, the first area should preferably be greater than or equal to 30% and less than or equal to 70% of the second area.

Furthermore, in a case where the area of the shield electrode SL1 is the sum of the total area of the openings OP1 and the total area of the electrode portions IE1, the total area of the openings OP1 is greater than or equal to 20% of the area of the shield electrode SL1, more preferably, greater than or equal to 30% and less than or equal to 70% of the area of the shield electrode SL1.

FIG. 11 is an enlarged plan view of a part of the shield electrode SL1 shown in FIG. 10. FIG. 11 is a plan view in an a-b plane defined by a direction a and a direction b. The direction a and the direction b are orthogonal to each other and correspond to directions in which the sides of the opening OP1 which are orthogonal to each other extend. In the present embodiment, the openings OP11 and OP12 have substantially the same size. That is, a length a1 of the sides extending in the direction a of the opening OP11 and a length a2 of the sides extending in the direction a of the opening OP12 are equal. In addition, a length b1 of the sides extending in the direction b of the opening OP11 and a length b2 of the sides extending in the direction b of the opening OP12 are equal. The size of the opening OP11 and the size of the opening OP12 can be appropriately changed in accordance with the frequency of EMI noise to be blocked. The lengths a1, b1, a2 and b2 are, for example, greater than or equal to 10 µm and less than or equal to 500 µm.

Figure 12:
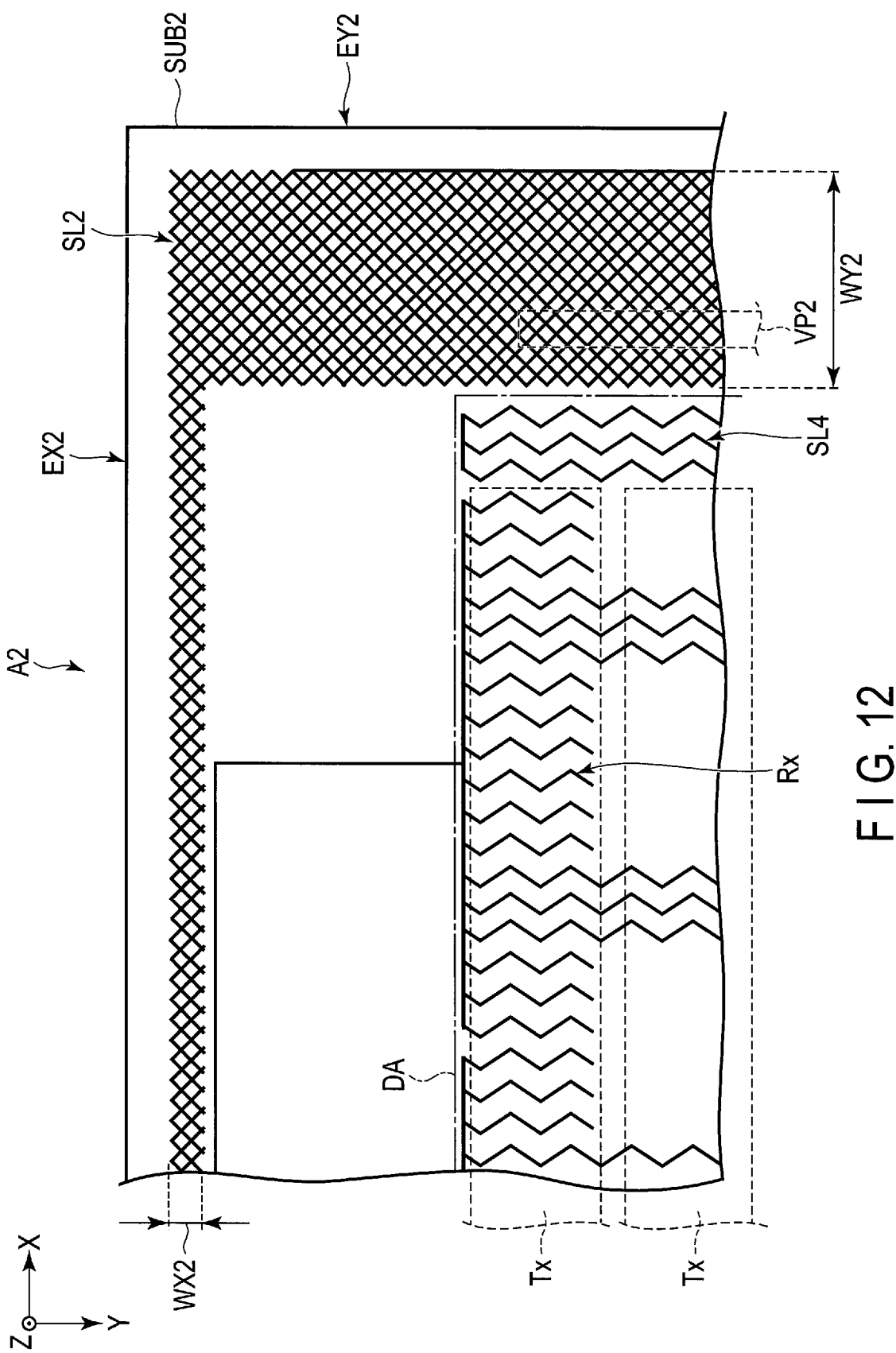
FIG. 12 is an enlarged plan view of a region A2 shown in FIG. 6.

FIG. 12 is an enlarged plan view of a region A2 shown in FIG. 6. The region A2 is a region including the end portion EX2 and the end portion EY2. The power line VP2 provided in the first substrate SUB1 is located between the display region DA and the end portion EY2 and extends in a direction in which the drive electrodes Tx are arranged, that is, in the second direction Y.

The shield electrode SL2 is provided along the end portions EX2 and EY2. The shield electrode SL2 is, for example, spaced apart from both the end portion EX2 and the end portion EY2. The shield electrode SL2 overlaps the power line VP2. In the example illustrated, a width WY2 of the shield electrode SL2 extending along the end portion EY2 is greater than a width WX2 of the shield electrode SL2 extending along the end portion EX2.

In the example illustrated, the second substrate SUB2 comprises a shield electrode SL4 arranged between the shield electrode SL2 and the detection electrodes Rx. The potential of the shield electrode SL4 is, for example, the same potential as that of the detection electrode Rx. Alternatively, the potential of the shield electrode SL4 may be, for example, a fixed potential such as a ground potential. The shield electrode SL4 is located in the display region DA, and as is the case with the detection electrode Rx, the shield electrode SL4 is formed of wavy thin metal wires. Note that the shield electrode SL4 may be omitted.

Figure 13:
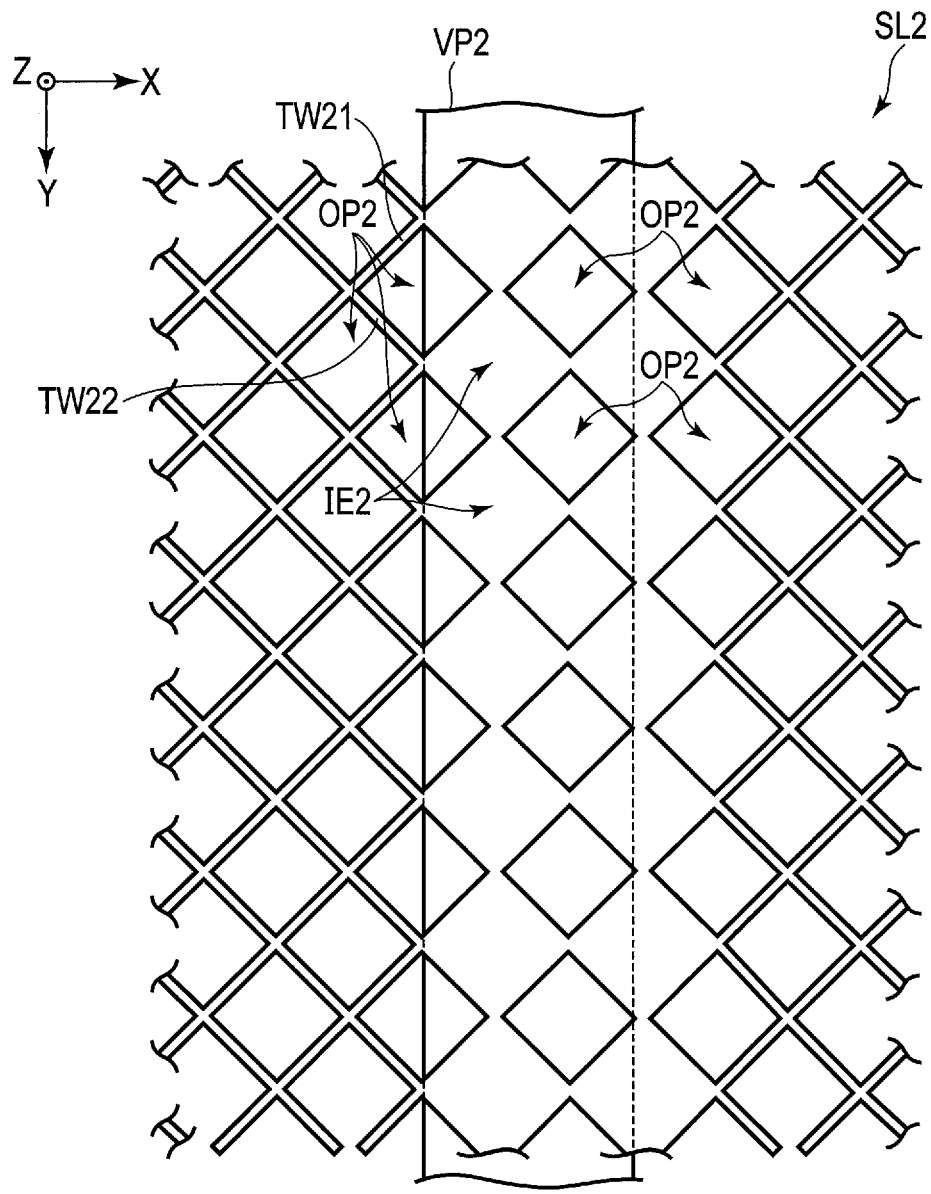
FIG. 13 is an enlarged plan view of a vicinity of a power line VP2 shown in FIG. 12.

FIG. 13 is an enlarged plan view of the vicinity of the power line VP2 shown in FIG. 12. The shield electrode SL2 comprises openings OP2 and electrode portions IE2. A part of the shield electrode SL2 overlaps the power line VP2 in a planar view. That is, at least some of the openings OP2, and some of the electrode portions IE2 overlap the power line VP2. The openings OP2 are regularly arranged. In the example illustrated, the openings OP2 are arranged in the first direction X and the second direction Y. In addition, the openings OP2 are arranged in a staggered manner in directions in which thin wires TW21 and TW22 which form the openings OP2 extend. The openings OP2 have, for example, a substantially square shape. Each electrode portion IE2 corresponds to an island-shaped region of the shield electrode SL2 which is surrounded by four openings OP2. Therefore, the electrode portions IE2 have, for example, a substantially square shape.

In the present embodiment, the total area (third area) of regions in which the openings OP2 and the power line VP2 overlap is greater than or equal to 20% of the area (fourth area) of a region in which the power line VP2 and the shield electrode SL2 overlap. The fourth area here corresponds to the sum of the total area (third area) of the openings OP2 overlapping the power line VP2 and the total area of the electrode portions IE2 overlapping the power line VP2, of the shield electrode SL2. In addition, the third area should preferably be greater than or equal to 30% and less than or equal to 70% of the fourth area.

Figure 14:
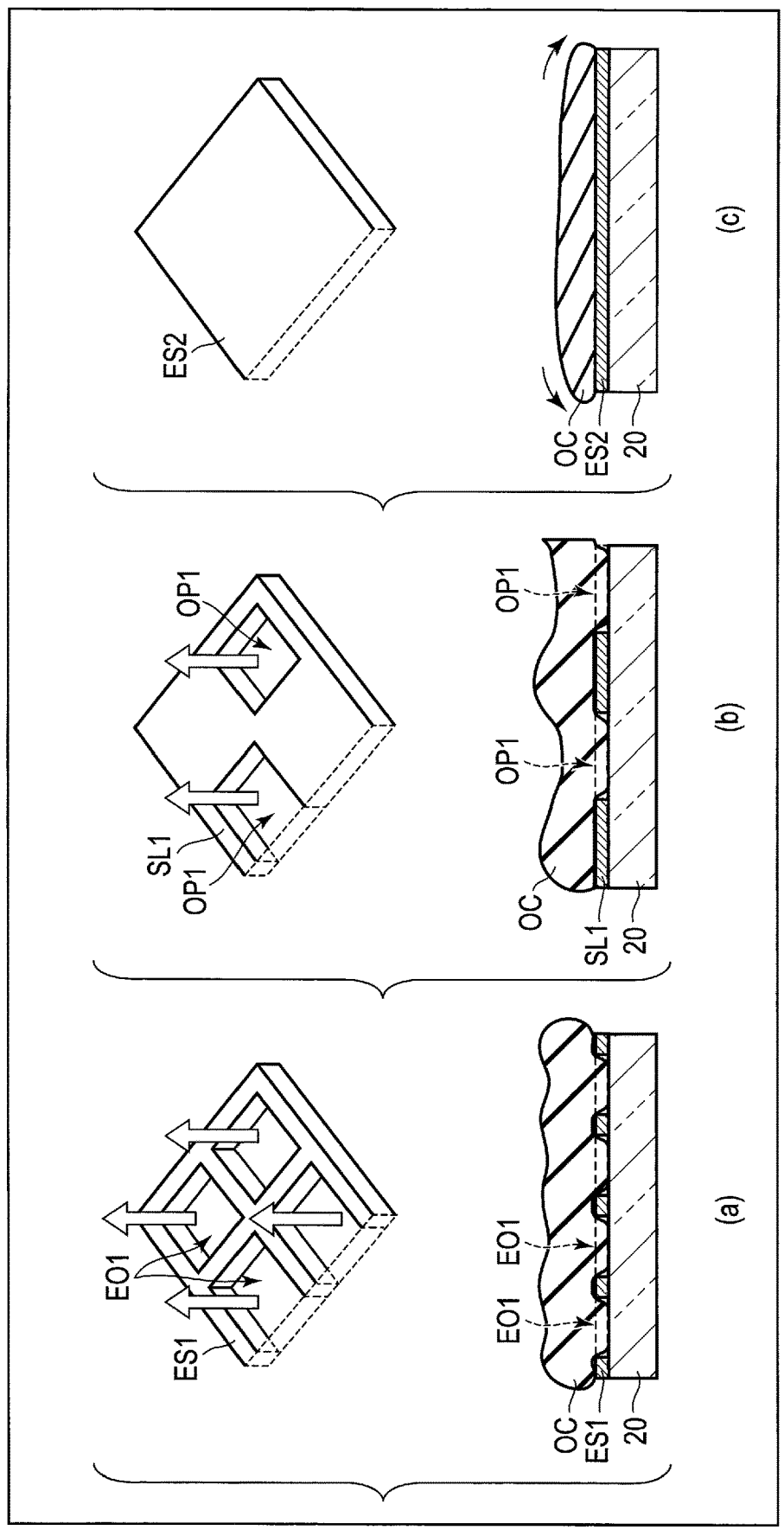
FIG. 14 is an illustration for explaining the relationship between the area of an opening OP1 and the shielding effect of the shield electrode SL1, and the shape of an overcoat layer OC.

FIG. 14 is an illustration for explaining the relationship between the total area of the openings OP1 and the shielding effect of the shield electrode SL1, and the shape of the overcoat layer OC. The shield electrode SL1 of the present embodiment is shown in (b) of FIG. 14. A shield electrode ES1 and a shield electrode ES2 as comparative examples are shown in (a) of FIG. 14 and (c) of FIG. 14, respectively. The shield electrodes SL1, ES1 and ES2 are formed on the basement 20 and are covered with the overcoat layer OC.

As shown in (a) of FIG. 14, the total area of openings EO1 provided in the shield electrode ES1 is greater than the total area of the openings OP1 provided in the shield electrode SL1 shown in (b) of FIG. 14. In the example illustrated, the openings EO1 and the openings OP1 have the same size, and the number of the openings EO1 is substantially twice the number of the openings OP1. According to the shield electrode ES1 having such a structure, when the overcoat layer OC is applied, the overcoat layer OC is held in the shield electrode ES1. On the other hand, since the total area of the openings EO1 is large, the shielding performance against EMI noise radiating from the power line VP1 will be deteriorated in a case where the power line VP1 is located below the shield electrode ES1.

As shown in (c) of FIG. 14, the shield electrode ES2 does not have openings. Therefore, most of EMI noise radiating from the power line VP1 can be blocked. On the other hand, according to the shield electrode ES2 having such a structure, when the overcoat layer OC is applied, the overcoat layer OC tends to spread on the shield electrode ES2. Therefore, the thickness of the overcoat layer OC tends to become less than a desired thickness.

On the other hand, as shown in (b) of FIG. 14, according to the present embodiment, the first area in which the openings OP1 and the power line VP1 overlap is set to be greater than or equal to 20%, more preferably, greater than or equal to 30% of the second area in which the openings OP1 and the electrode portions IE1 of the shield electrode SL1 overlap the power line VP1. As a result, the contact area in which the overcoat layer OC and the basement 20 are in contact with each other can be secured, and the spreading of the overcoat layer OC can be suppressed. In addition, the first area is set to be less than or equal to 70% of the second region. As a result, the shielding performance against the EMI noise radiating from the power line VP1 can be sufficiently obtained. In the case of the shield electrode SL2 shown in FIG. 13 also, similar advantageous effects can be obtained.

That is, according to the present embodiment, the shield electrode SL1 having the openings OP1 and the electrode portions IE1 is provided in the region overlapping the power line VP1, and the shield electrode SL2 having the openings OP2 and the electrode portions IE2 is provided in the region overlapping the power line VP2. Therefore, the overcoat layer OC which is to be provided on the shield electrodes SL1 and SL2 can be formed with a desired thickness, and the EMI noise radiating from the power lines VP1 and VP2 can be blocked. As a result, the highly-reliable display device 1 can be provided.

In addition, the openings OP1 and OP2 are regularly arranged. Therefore, the shielding performance against the EMI noise radiating from the power lines VP1 and VP2 can be uniformly obtained in both the region in which the power line VP1 and the shield electrode SL1 overlap and the region in which the power line VP2 and the shield electrode SL2 overlap.

Furthermore, since the shield electrode SL2 has the electrode portions EI2, the resistance value of the shield electrode SL2 is reduced. As a result, radiation of ESD noise via the shield electrode SL2 is suppressed, and damage of the sensor 4 can be reduced.

FIG. 15 is a plan view showing another example of the shield electrode SL1. The example shown in FIG. 15 is different from the example shown in FIG. 11 in that the size of the opening OP11 is different from the size of the opening OP12. In the example illustrated, the length a1 is greater than the length a2, and the length b1 is greater than the length b2. In the present example also, advantageous effects similar to those of the example shown in FIG. 11 can be obtained. In addition, according to the present example, a distance Da in the direction a between the opening OP11 and the opening OP12 is greater than a distance Da in the direction a between the opening OP11 and the opening OP12 in FIG. 11. Furthermore, a distance Db in the direction b between the opening OP11 and the opening OP12 is greater than a distance Db in the direction b between the opening OP11 and the opening OP12 in FIG. 11. Therefore, the resistance value of the shield electrode SL1 can be reduced. In addition, even if leakage of EMI noise from the opening OP11 occurs, leakage of EMI noise of the same frequency from the opening OP12 can be suppressed, and the shielding performance can be improved.

FIG. 16 is a plan view showing another example of the shield electrode SL1. The example shown in FIG. 16 is different from the example shown in FIG. 15 in that the opening OP11 has a substantially rectangular shape. In the example illustrated, the length a1 is greater than the length a2, and the length b1 is substantially equal to the length b2. In the present example also, advantageous effects similar to those of the example shown in FIG. 15 can be obtained.

Note that the examples shown in FIGS. 15 and 16 can also be applied to the shield electrode SL2.

In the above-described embodiment, the shield electrode SL1 corresponds to the first shield electrode. The openings OP1 and OP11 correspond to the first opening, and the electrode portion IE1 corresponds to the first electrode portion. The power line VP1 corresponds to the first power line. The shield electrode SL2 corresponds to the second shield electrode. The opening OP2 corresponds to the second opening, and the electrode portion IE2 corresponds to the second electrode portion. In addition, the opening OP12 corresponds to the third opening. The shield electrode SL3 corresponds to the third shield electrode. The overcoat layer OC corresponds to an organic insulating layer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
a first substrate comprising drive electrodes;
a second substrate facing the first substrate and comprising detection electrodes; and
a mesh-patterned first shield electrode arranged in a non-display region in the second substrate; and
a first power line provided in the first substrate and electrically connected to the drive electrodes, wherein
the first shield electrode comprises a plurality of first openings and a first electrode portion located between the first openings adjacent to each other,
an area of the first electrode portion is greater than an area of a first opening,
the first power line extends in a direction in which the drive electrodes are arranged, and
the first opening and the first electrode portion overlap the first power line.
2. The display device of claim 1, wherein
a first area in which the first power line and the first opening overlap is greater than or equal to 20% of a second area in which the first power line and the first shield electrode overlap.
3. The display device of claim 2, wherein the first area is greater than or equal to 30% and less than or equal to 70% of the second area.
4. The display device of claim 1, further comprising a mesh-patterned second shield electrode arranged on an outside of the first shield electrode in the second substrate, wherein
the second shield electrode comprises a second opening and an island-shaped second electrode portion.
5. The display device of claim 4, further comprising a second power line provided in the first substrate and electrically connected to the drive electrodes, wherein
the second power line extends in a direction in which the drive electrodes are arranged, and
the second opening and the second electrode portion overlap the second power line.
6. The display device of claim 5, wherein a third area in which the second power line and the second opening overlap is greater than or equal to 20% of a fourth area in which the second power line and the second shield electrode overlap.
7. The display device of claim 6, wherein the third area is greater than or equal to 30% and less than or equal to 70% of the fourth area.
8. The display device of claim 1, wherein
the first shield electrode comprises a third opening spaced apart from the first opening, and
a size of the first opening and a size of the third opening are different from each other.
9. The display device of claim 1, further comprising:
wiring lines provided in the second substrate and electrically connected to the detection electrodes; and
a third shield electrode provided in the second substrate and located between the wiring lines and the detection electrodes.
10. The display device of claim 1, wherein
a potential of the first shield electrode is a potential equal to either a fixed potential or a potential of the detection electrodes.
11. The display device of claim 1, wherein
the second substrate has a first surface facing the first substrate and a second surface located on an opposite side from the first surface, and
the first shield electrode and the detection electrodes are located on the second surface, and are formed of a same material.

12. The display device of claim 11, further comprising an organic insulating layer covering the first shield electrode and the detection electrodes.

13. A touch detection device comprising:
a first substrate comprising drive electrodes;
a second substrate facing the first substrate and comprising detection electrodes; and
a mesh-patterned first shield electrode arranged in a region in which the detection electrodes are not arranged, in the second substrate; and
a first power line provided in the first substrate and electrically connected to the drive electrodes, wherein
the first shield electrode comprises a plurality of first openings and a first electrode portion located between the first openings adjacent to each other,
an area of the first electrode portion is greater than an area of a first opening,
the first power line extends in a direction in which the drive electrodes are arranged, and
the first opening and the first electrode portion overlap the first power line.

14. The touch detection device of claim 13, wherein a first area of the first opening of the first shield electrode is greater than or equal to 20% of an area of the first shield electrode.

15. The touch detection device of claim 14, wherein the first area is greater than or equal to 30% and less than or equal to 70% of the area of the first shield electrode.

16. The touch detection device of claim 13, further comprising a mesh-patterned second shield electrode arranged on an outside of the first shield electrode in the second substrate, wherein
the second shield electrode comprises a second opening and an island-shaped second electrode portion.

17. The touch detection device of claim 13, wherein
the first shield electrode comprises a third opening spaced apart from the first opening, and
a size of the first opening and a size of the third opening are different from each other.

18. The touch detection device of claim 13, further comprising:
wiring lines provided in the second substrate and electrically connected to the detection electrodes; and
a third shield electrode provided in the second substrate and located between the wiring lines and the detection electrodes.

19. The touch detection device of claim 13, wherein a potential of the first shield electrode is a potential equal to either a fixed potential or a potential of the detection electrodes.

* * * * *